United States Patent [19]

Terao et al.

[11] Patent Number: 5,038,338
[45] Date of Patent: Aug. 6, 1991

[54] RECORDING WAVEFORM FOR MARK-LENGTH MODULATION OPTICAL RECORDING

[75] Inventors: Motoyasu Terao, Tokyo; Tetsuya Nishida, Koganei; Hiroshi Yasuoka, Kokubunji; Keikichi Andoo, Musashino; Norio Ohta, Iruma, all of Japan

[73] Assignee: Hitachi, Ltd., Tokyo, Japan

[21] Appl. No.: 598,811

[22] Filed: Oct. 17, 1990

Related U.S. Application Data

[63] Continuation of Ser. No. 185,690, Apr. 22, 1988, abandoned.

[30] Foreign Application Priority Data

Apr. 24, 1987 [JP] Japan .................. 62-99749

[51] Int. Cl.$^5$ .................................. G11B 7/00
[52] U.S. Cl. .................................... 369/116
[58] Field of Search .............. 369/100, 116, 121, 122, 369/109; 365/113; 346/76 L

[56] References Cited

U.S. PATENT DOCUMENTS

| | | | |
|---|---|---|---|
| 4,710,911 | 12/1987 | Yamada et al. | 369/100 |
| 4,719,594 | 1/1988 | Young et al. | 365/215 X |
| 4,787,077 | 11/1988 | Barton et al. | 369/100 |
| 4,894,816 | 1/1990 | Sukeda et al. | 369/116 |
| 4,939,717 | 7/1990 | Ohno et al. | 369/116 |

FOREIGN PATENT DOCUMENTS 56-163528 12/1981 Japan .................. 369/100
61-188750 8/1986 Japan .................. 369/100

OTHER PUBLICATIONS

"Optical Storage Media"; Bell et al; Proceedings of SPIE, vol. 420, line 6–10, 1983, Arl. Va.
"New Optical Recording Material for Video Disc System", Watanabe et al, J. Appl. Physics 54, (3), Mar. 1983, pp. 1256–1260.

Primary Examiner—Donald McElheny, Jr.
Attorney, Agent, or Firm—Kenyon & Kenyon

[57] ABSTRACT

A method of recording information by changing a recording medium through irradiation with an energy beam such as a light beam, electron beam or the like. A single pulse or a plurality of pulses are employed for forming recorded dots. The pulse has a pulse width shorter than a time required for the center of energy beam spot to move from one to other end of the dot upon recording thereof. By virtue of the possibility of reversible change even in a recording film susceptible to high rate speed of change, the rate of information transfer can be increased. Overwrite recording can also be accomplished with the single laser beam. An increased amount of information can be handled in the recording and reproduction.

10 Claims, 1 Drawing Sheet

RECORDING WAVEFORM FOR MARK-LENGTH MODULATION OPTICAL RECORDING

This application is a continuation, of U.S. application Ser. No. 07/185,690, filed 4/22/88 now abandoned.

BACKGROUND OF THE INVENTION

The present invention relates to a method of recording information by using a recording medium which allows information to be rewritten through irradiation with an energy beam such as a light beam, electron beam or the like. More particularly, the invention is concerned with an information recording method which can be effectively applied to a phase change type disc adapted for recording, erasing and rewriting by using a laser beam.

As methods of recording/erasing information on or from the phase change type optical disc recording medium, there is known a method disclosed, for example, in Japanese Patent Application Laid Open No. JP-A-59-71140. According to this known method, erasing through crystallization of information recorded already on a recording film thereof is accomplished by maintaining the recording film for a relatively long period at a temperature at which the recording film can be crystallized through irradiation of a light spot of elliptic shape having a major axis extending trackwise. Subsequent recording of new information is realized by irradiating an adequately focused circular light beam modulated by the information signal to be recorded. Recently, in the course of studies conducted by the inventors of the present application in an effort to improve the material for the recording film, a method was developed which allows the recording film to be crystallized by means of an adequately focused circular light spot moving on the disc. More specifically, information on the disc could be erased with the circular light spot during one rotation of the disc, and subsequently recording could be accomplished during the single succeeding rotation of the disc through irradiation with the laser beam having power modulated correspondingly. Further, by modulating the laser power in accordance with the information signal between the crystallizing power level and the amorphizing power level, rewriting of the information could be accomplished in the course of the single revolution of the disc.

However, in the case of the abovementioned technique, rate or speed of the change in atomic arrangement (e.g. crystallization) in the recording film has to be further increased when the rotating speed of the disc is increased with a view to realizing higher information transfer rate. In that case, even when the crystalline material is molten under irradiation by the energy beam (e.g. laser beam), the atomic arrangement resumes the original state (e.g. through recrystallization) during cooling after the irradiation, making it impossible to bring about the change in the atomic arrangement in the reverse direction (e.g. amorphization).

SUMMARY OF THE INVENTION

An object of the present invention is to provide an information recording method which is essentially immune to the problems of the prior art described above and which allows the phase change to occur reversively even when a recording film susceptible to high rate of phase change is employed.

The above object can be accomplished by forming recorded dots with a single pulse or a plurality of pulses of an energy beam rising to a higher power level (e.g. amorphizing power level) having a medium (e.g. crystallizing) power level before forming the recorded dot and the pulse width or duration which is shorter than a time taken for the center of the energy beam spot to move from one to the other end of the recorded dot. The beam pulse may preferably have a pulse duration shorter than $\frac{3}{4}$ of the time that it takes for the light spot center to move from one to other end of the dot upon recording thereof, more preferably shorter than $\frac{1}{2}$ and most preferably shorter than $\frac{1}{4}$.

By making the pulse width shorter (narrower) as described above, heat dissipation due to heat conduction from the irradiated dot location to the ambient region can be prevented, whereby beam energy for the irradiation can be lowered relatively. And more over, deformation of reproduced signal due to heat accumulation even when high power level continued for a long time can be reduced.

According to the present invention, when overwriting of information (i.e. rewriting through overwriting without preliminarily erasing the recorded information) is performed with a single laser beam, the laser power is not lowered to the power level for reading-out of information at least approximately over the whole period of the overwriting operation. Thus, the problem that the rate of quenching after the laser beam irradiation tends to be lowered can be solved to great advantage.

The recording medium which can be employed in carrying out the invention may be formed of a material capable of undergoing a crystal-amorphous phase change. Additionally, it may be a material susceptible to other types of changes in atomic arrangement or electron spin. By way of example, the material capable of crystal-to-crystal phase change in atomic arrangement which requires quenching as well as the material susceptible to amorphous-to-amorphous phase change in atomic arrangement and magneto-optical recording materials can be employed. The method of the present invention is more effective for phase change recording media than for magneto-optical recording media. In this conjunction, it should be understood that the crystallizing power level as mentioned above means not only the power level required for crystallization of amorphous material but also means a lower power level at which the phase change mentioned above can take place.

The effectiveness of the method according to the invention is independent of the type of energy beam used. In other words, a light beam, an electron beam, an ion beam and others can used. It should, however, be mentioned that in case the electron beam or an ion beam is employed, a protective film deposited on the recording film of the recording medium should be preferably in thickness less than 1 μm and more preferably less than 1000 Å.

DETAILED DESCRIPTION OF THE PRESENT INVENTION

The present invention will be described in conjunction with an exemplary embodiment thereof.

The structure of a recording medium will be first explained with reference to FIG. 2.

Figure 2:
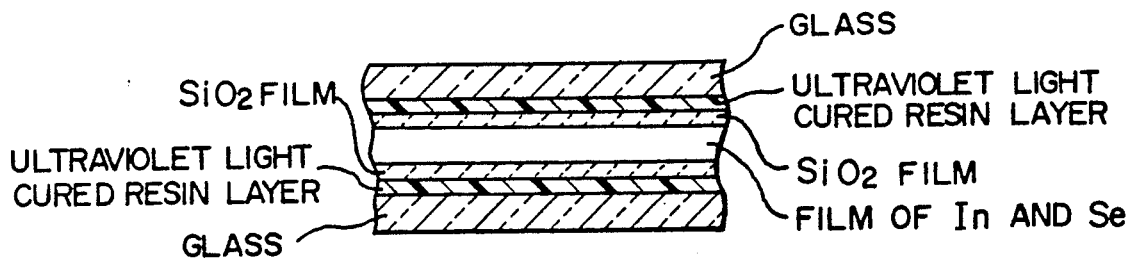
FIG. 2 is a sectional view of a recording medium on which information is to be recorded according to the present invention.

A recording film containing In and Se as main components and susceptible to a information signal recording and erasing by virtue of a reversible phase change between a crystalline state and an amorphous (or approximately amorphous) state and having both surfaces coated with protective films of $SiO_2$ in a sandwiched structure is formed on a surface of a disc-like glass substrate having an ultraviolet light cured resin layer deposited thereon as shown in FIG. 2. Tracking grooves and pits indicative of addresses are copied on the surface of the ultraviolet light cured resin layer. Subsequently, another ultraviolet light cured resin is applied over the abovementioned protective film, the multilayer structure thus prepared being then bonded to another glass substrate and cured under irradiation of ultraviolet light.

Figure 1:
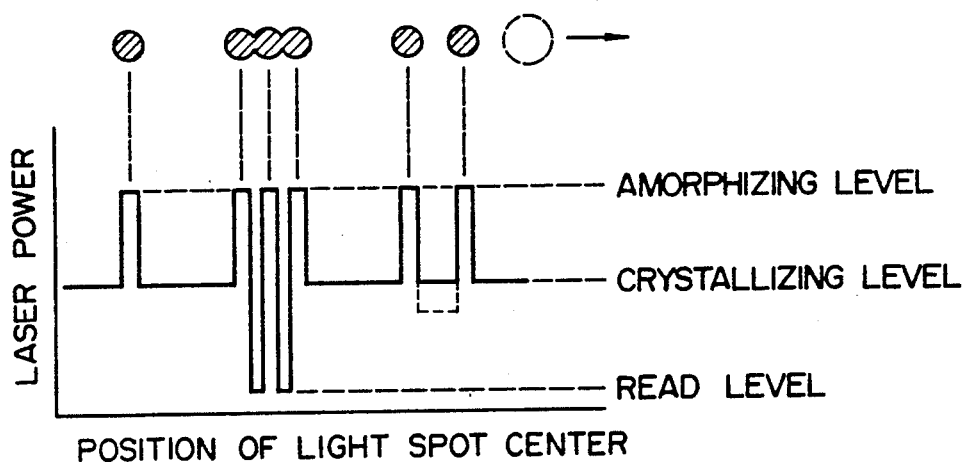
FIG. 1 a view for illustrating the principle underlying the information recording method according to the present invention.

Subsequently, the optical disc manufactured as described above is rotated at a speed of 600 rpm, and a location to be recorded is searched while performing the tracking and the auto-focusing. At the location to be recorded, power of the laser light beam is increased from a reading power level to a crystallizing level, being followed by modulation of the power in such a manner as illustrated in FIG. 1. In this figure, an array of amorphized dots formed on a recording track is shown at the top. The remaining portion of the track is in the crystallized state. The inter-track regions remain in the state as deposited. In practical applications, position of the light spot is immobile, but a point or dot on the disc is moved to the left as viewed in FIG. 1. However, for convenience of illustration, the figure is so depicted that the dot on the disc remains immobile with the light spot being moved to the right. In the graphic representation shown at the bottom in FIG. 1, the center position of the light spot which is assumed to move rightward is taken along the abscissa while the level of laser power is taken along the ordinate. At the dot region which is to be amorphized in accordance with the information signal, the laser power is increased to an amorphizing level only for a short time. The time span during which the laser power is increased to the amorphizing level is about ½ of the time required for the center of the light spot to move from one to other end of a corresponding dot-like region to be amorphized (or dot-like region to be degraded in crystallinity). The time span during which the laser power is increased is defined as to width at a half of height of the laser pulse rising up from the crystallizing level to the amorphizing level. As the result of irradiation with the laser beam having the amorphizing level, the irradiated dot-like region is molten and subsequently quenched to become amorphous. In case the amorphized dot-like region which is twice or more as long as that of the shortest amorphous region is required to be formed, the inherent recording waveform can be divided into a plurality (three in the case of the illustrated example) of short irradiation pulses, as is shown in FIG. 1 at a center portion thereof. The gap between these pulses is more preferably less than ½ of the pulse width. Consequently, regions resulting from such plural pulse irradiation form an elongated amorphous region. When such divided short pulses are employed, the irradiation power should preferably be made lower than the crystallizing power level between the pulses. More preferably, the power level should be decreased to zero or the reading level during the inter-pulse period. Further, the laser power may be decreased down to the crystallizing level or slightly higher level in dependence on the composition of the recording film and that of the protective film. Magnitude of decrease in the laser power should preferably be increased as the inter-pulse distance becomes narrower. In the exemplary case illustrated in FIG. 1, the laser power is lowered to the reading level. Through irradiation with the plural divided pulses, there can be formed on the disc such a recording pattern which can ensure reproduction of the signal with high fidelity to the original signal even when the latter includes a pulse signal component having a long pulse width. When the information signal to be recorded includes the pulses corresponding to shorter recorded dot length than 1.2 $\mu$m, the pulse division mentioned above can of course be spared. More preferably, the power level between two pulses corresponding to recorded dots of short distance, for example less than 3 $\mu$m, is lowered as shown in FIG. 1 by a dotted line. The laser power waveform employed in the illustrative embodiment of the invention is so selected as to allow the rewriting of information through the overwriting without need for the preceding erasure. However, it is equally preferable that information is at least partly erased by preceding (crystallizing or amorphizing) irradiation before the irradiation in this embodiment.

The width of the pulse to the amorphizing level should preferably be selected equal to ½ of the time taken for the center of the light spot to move from one to other end of the dot-like region to be amorphized. More preferably, the pulse width of concern should be ¼ or shorter for realizing the satisfactory amorphization.

It is preferred to shorten the pulse width similarly when the recording is performed with the laser light beam modulated between the reading level and the amorphizing level after all the tracks have been once erased through crystallization with a continuous laser irradiation. In this case, it is however noted that the cooling rate is inherently high since the laser power level is lowered to the reading level during the inter-pulse period. Consequently, the effect attainable with this process is not so significant as in the case of the embodiment operation.

In the latter case, the crystallizing power level may be so adjusted as to lie in the range of 30 to 95% of the amorphizing level. Then, the signal can be reproduced regardless of the pulse width. More preferably, the crystallizing power level should be in the range of 55 to 90%.

In the foregoing description, it has been assumed that the recording is realized by amorphization. However, it is equally possible to regard crystallization as recording.

As will now be appreciated from the foregoing description, the high rate of information transfer can be accomplished because of possibility of reversible change in the recording film even when the recording film susceptible to high rate of change is used. Further, the overwrite recording can be accomplished with the single laser beam. These features contribute advantageously to the recording/reproduction capability for a large amount of information.

What is claimed is:

1. A method of recording information on a recording medium, which is capable of achieving a first phase by application of an energy beam of a first energy level and a second phase by application of the energy beam of a second energy level, by projecting on the recording medium pulses of the energy beam so as to record the information on the recording medium in a form of one or more dots where the recording medium takes the first phase, said method comprising the steps of:

moving the recording medium relative to the energy beam; and projecting on the recording medium the energy beam of the second energy level when no dot is to be recorded.

projecting a single pulse of the energy beam having the first energy level and a predetermined pulse length when a short dot, having a length less than a predetermined length, is to be recorded; and projecting a plurality of consecutive pulses of the energy beam each having the first energy level and said predetermined pulse length when a dot having a length not less than said predetermined length is to be recorded, said predetermined pulse length corresponding to a duration time which is shorter than a time interval required for the energy beam, in its relative movement, to move from one end to an opposite end of the short dot to be recorded.

2. A method of recording information according to claim 1, wherein said pulse duration time is shorter than $\frac{3}{4}$ of the time required for the center of said energy beam to move from the one to the opposite end of said dot to be recorded.

3. A method of recording information according to claim 1, wherein said energy beam has an energy level of not higher than any of said first and second energy levels between adjacent two of said plurality of pulses.

4. A method of recording information according claim 1, wherein said energy beam has an energy level lower than any of said first and second energy levels between adjacent two of said plurality of pulses.

5. A method of recording information using a recording medium which is variable between two different phases and capable of entering a first phase by application of an energy beam of a first power level and a second phase by application of an energy beam of a second power level, wherein the information is recorded on the recording medium in a form of one or more dots where the recording medium is in said first phase, said method comprising the steps of:

projecting an energy beam on the recording medium with the second power level;

moving the recording medium relative to the energy beam; and modifying the energy beam in a form of a pulse having the first power level and continuing for a first time period when the information is to be recorded in a form of a short dot on the recording medium, said short dot having a length less than a first predetermined dot length, wherein said first time period is less than a time for moving the energy beam across the recording medium by a distance equal to said first predetermined dot length;

wherein when the information is to be recorded in a form of a dot longer than said first predetermined dot length, the energy beam alternates between the first power level and a third power level, not higher than any of the first and second power levels a plurality of times for a second time period corresponding to a length of the longer dot.

6. The method of claim 5 wherein said second power level is lower than said first power level.

7. The method of claim 5 wherein said first power level amorphizes the recording medium.

8. The method of claim 7, wherein said second power level is 30 to 95% of said first power level.

9. The method of claim 5 wherein said first time period is less than $\frac{1}{2}$ of said the time for moving the energy beam across the recording medium by a distance equal to a length of said short dot.

10. The method of claim 5 wherein the energy beam at said second power level causes the recording medium to be crystallized.

* * * * *

UNITED STATES PATENT AND TRADEMARK OFFICE
CERTIFICATE OF CORRECTION

PATENT NO. : 5,038,338
DATED : August 6, 1991
INVENTOR(S) : Motoyasu Terao, et al It is certified that error appears in the above-identified patent and that said Letters Patent is hereby corrected as shown below:

Title Page:
Abstract, line 7, before "other" insert --the--.

Column 2, line 18, change "more over" to --moreover--.

Column 2, line 20, after "level" insert --is--.

Column 3, line 9, before "information" change "a" to --the--.

Column 3, line 50, before "other" insert --the--.

Column 4, line 36, before "other" insert --the--.

Column 4, line 64, after "with" change "the" to --a--.

Signed and Sealed this

Twenty-fifth Day of May, 1993

Attest:

MICHAEL K. KIRK

Attesting Officer

Acting Commissioner of Patents and Trademarks